United States Patent [19]
Johnson

[11] Patent Number: 5,872,837
[45] Date of Patent: Feb. 16, 1999

[54] SYSTEM AND METHOD FOR TRANSMITTING DATA AND COMMANDS USING A TELEPHONE

[75] Inventor: William J. Johnson, Flower Mound, Tex.

[73] Assignee: MCI Worldcom, Inc., Ga.

[21] Appl. No.: 672,186

[22] Filed: Jun. 27, 1996

[51] Int. Cl.$^6$ ............................ H04M 11/00; H04M 1/00
[52] U.S. Cl. ..................................... 379/93.27; 379/93.18; 379/110.01
[58] Field of Search ............................ 379/93.18, 93.26, 379/93.27, 110.01, 283, 386, 52

[56] References Cited

U.S. PATENT DOCUMENTS

| | | | |
|---|---|---|---|
| 3,618,038 | 11/1971 | Stein | 340/172.5 |
| 4,087,635 | 5/1978 | Vasquez | 379/386 |
| 4,202,038 | 5/1980 | Petersson | 364/709 |
| 4,427,848 | 1/1984 | Tsakanikas | 179/2 |
| 4,674,112 | 6/1987 | Kondraske et al. | 379/93.18 |
| 5,339,358 | 8/1994 | Danish et al. | 379/110.01 |

OTHER PUBLICATIONS

Martin, James, *Design of Man–Computer Dialogues*, Prentice–Hall, Englewood Cliffs (New Jersey), 1973, pp. 283–306.

*Primary Examiner*—Curtis A. Kuntz
*Assistant Examiner*—George Eng.

[57] ABSTRACT

A system and method for receiving data and commands from a telephone are described. The system receives a signal (such as a DTMF signal) from a telephone. The system identifies a symbol (i.e., a key) associated with the signal, and determines a duration of the signal. Then, the system stores the symbol and duration in a queue. The received signals are preferably processed by service processors. The service processors translate the received signals according to their respective symbols and durations with reference to a translation table. These service processors provide interactive telecommunication services to telephone users. Also described is a calculator service processor that provides a calculator service to telephone users. The calculator service processor translates some of the signals as operands, and others of the signals as operators. The calculator service processor preferably translates these received signals according to their respective symbols and durations. The calculator service processor applies the operands to the operators to thereby perform mathematical operations.

13 Claims, 8 Drawing Sheets

| KEY PRESSED (SYMBOL) | MINIMUM DURATION | MAXIMUM DURATION | INTERPRETED MESSAGE |
|---|---|---|---|
| # | D1 | D2 | END CURRENT OUTGOING MESSAGE |
| # | D2 | D3 | BACK OUT ONE INSTRUCTION LEVEL |
| # | D3 | D4 | TERMINATE CALL |
| 1 | D1 | D2 | 1 |
| 1 | D2 | D3 | STORE TO MEMORY CELL |
| 2 | D1 | D2 | 2 |
| 2 | D2 | D3 | RETREIVE FROM MEMORY CELL |
| 2 | D3 | D4 | a |
| 2 | D4 | D5 | b |
| 2 | D5 | D6 | c |

SYSTEM AND METHOD FOR TRANSMITTING DATA AND COMMANDS USING A TELEPHONE

BACKGROUND OF THE INVENTION

1. Field of the Invention

The present invention relates generally to telecommunications, and more particularly to using a telephone to transmit data and commands to a telephonic data processing system.

2. Related Art

ENTERING COMMANDS AND DATA VIA A TELEPHONE

Many automated services are now available via telephone. Such services, called interactive telecommunication services, are directed to contests, lotteries, games, polls, banking, shopping, marketing, etc.

Interactive telecommunication services are automated. Typically, a user dials a telephone number associated with a desired service. A telephone connection is established between the user and a computer. The user interacts with the computer via the telephone to obtain the services provided by the computer, and desired by the user. The computer typically includes some type of audio unit to audibly convey instructions, menu choices, information, etc., to the user via the telephone connection.

The user must be able to transmit commands and information to the computer via the telephone. Conventionally, the touch tone transmitter of the telephone is used to transmit commands and information to the computer. For example, to transmit "3" to the computer, the user presses the "3" key on the telephone's touch tone keypad. This results in the transmission to the computer of a DTMF (dual tone multiple frequency) signal having a frequency assigned to the "3" key.

However, this conventional scheme is very limited because typical telephone keypads are designed to provide only twelve distinct characters (i.e., 1, 2, 3, 4, 5, 6, 7, 8, 9, 0, *, #). Accordingly, when using this scheme, the user is very limited in the variety and scope of the commands and information that can be transmitted to the computer.

Many conventional schemes have been devised to translate the twelve keys on a conventional telephone touch tone keypad into the full alphanumeric character set. A first approach, called twin depression translation, requires that two keys on the telephone keypad be pressed in order to indicate an alphabetical character. According to this first approach, the alphabet is divided into the following three divisions:

Division 1: A, D, G, J, M, P, T, W;
Division 2: B, E, H, K, N, R, U, X, Z;
Division 3: C, F, I, L, 0, S, V, Y, Q.

An alphabetical character is designated by pressing either 1, 2, or 3 to indicate the Division, and then pressing the key assigned to the desired character (the * key is assigned to Q, and the # key is assigned to Z).

A second approach, called delayed depression translation, is similar to the first approach. In this second approach, an alphabetical character is designated by pressing either 1, 2, or 3 to indicate the Division. This key must be pressed for a duration that is greater than a preset limit. Then, the key assigned to the desired character is pressed. This key must be pressed for a duration less than the preset limit.

According to a third approach, an alphabetical character is indicated by pressing a key assigned to a desired character a number of times equal to the relative position of the inscription of the character on the key. For example, the "s" character is indicated by pressing the "7" key three times.

These conventional approaches are not ideal because they require the user to press multiple keys to indicate a character, or they require the user to press a single key multiple times to indicate a character. Many people do not have sufficient manual dexterity to use such systems easily and proficiently. Also, in many situations, it is difficult for the user to locate the placement of keys on the telephone keypad. This is especially true in instances where mobile telephones are used. In such instances, the user may not be able to look at the keypad while using the telephone (for example, the user may be driving an automobile).

Thus, what is required is an improved system and method for enabling a user to enter data and information via the touch tone keypad of a conventional telephone.

PERFORMING MATHEMATICAL CALCULATIONS WHEN A CALCULATOR IS NOT AVAILABLE OR CONVENIENT

The use and availability of telephones are widespread. Calculators and personal computers, while very popular, are not so widespread. Often, a person does not have a calculator or computer at the moment when an important mathematical calculation must be performed. However, the person may have access to a telephone. Accordingly, a need exists for enabling a person to perform mathematical calculations when the person only has a telephone.

Mobile telephones are becoming widespread. Many situations exist where it possible to use a mobile telephone, but impossible or at least inconvenient or unsafe for a person to use a calculator or computer. For example, people often use cellular telephones while driving. In such situations, the use of a cellular telephone does not require one to take his/her eyes off the road. People are very adept at using mobile telephones while driving without taking their eyes off the road. However, it is unsafe to use a computer or calculator while driving, since such use requires one to at least momentarily look at the computer screen or calculator display.

Accordingly, a need exists for enabling a person to perform mathematical calculations by telephone when it is inconvenient, unsafe, and/or impossible for the person to use a calculator or computer.

Furthermore, a need exists for enabling a person to perform mathematical calculations by using readily available, easy to use equipment, wherein such equipment can be used without the use of sight. Such an invention would be particularly useful to sight impaired persons.

SUMMARY OF THE INVENTION

Briefly stated, the present invention is directed to a system and method for receiving data and commands from a telephone. The system receives a signal (such as a DTMF signal) from a telephone. The system identifies a symbol (i.e., a key) associated with the signal, and determines a duration of the signal. Then, the system stores the symbol and duration in a queue.

The received signals are preferably processed by service processors. The service processors translate the received signals according to their respective symbols and durations. These service processors provide interactive telecommunication services to telephone users.

The present invention includes a calculator service processor that provides a calculator service to telephone users.

The calculator service processor translates some of the signals as operands, and others of the signals as operators. As just noted, the calculator service processor preferably translates these received signals according to their respective symbols and durations. The calculator service processor applies the operands to the operators to thereby perform mathematical operations.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Overview of the Invention

The present invention is directed to a system and method for enabling a user to transmit commands and information to a data processing system via manipulation of the touch tone keypad (or other input mechanism) on the user's telephone. According to the present invention, any character (alphanumeric or otherwise), any predefined command, and/ or any predefined message may be transmitted by pressing the keys on the telephone's keypad (or other keypad embodiment).

The invention is adapted for use with a conventional telephone having a keypad with twelve keys (i.e., 1, 2, 3, 4, 5, 6, 7, 8, 9, 0, *, #). However, the invention is intended and capable of working with any telephone that transmits DTMF (dual tone multiple frequency) signals or similar signals in response to a user's depression or manipulation of the telephone's keypad or other input mechanism (such as a rotary dialer). This input mechanism represents the traditional mechanism by which the user dials telephone numbers (thus, this input mechanism is also called the telephone's dialing mechanism).

Figure 1:
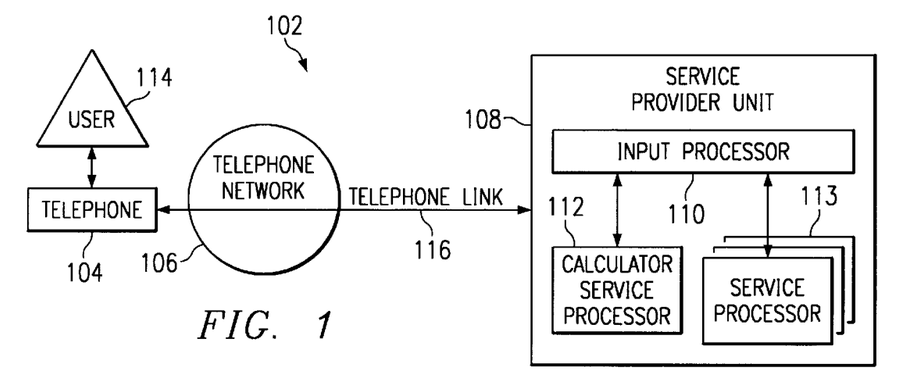
FIG. 1 is a block diagram of a telecommunications environment according to a preferred embodiment of the present invention.

FIG. 1 is a block diagram of a telecommunication environment 102 in which the invention is used. A user 114 utilizes a telephone 104 to establish a telephone link 116 via a telephone network 106 with a data processing system, such as service provider unit 108. Service processors 112, 113 in the service provider unit 108 provide services. These services may be lotteries, games, polls, information services, shopping services, financial services, investment services, etc.

The telephone link 116 between the user 114 and the service provider unit 108 is established in a conventional manner. Preferably, the user 114 dials a telephone number associated with one of the service processors 112, 113 (described below) contained in the service provider unit 108 to initiate the establishment of the telephone link 116 between the user 114 and the service provider unit 108. The telephone link 116 represents any combination of communication mediums.

The service provider unit 108 preferably utilizes an Audio Response Unit (ARU) to provide audible commands, menu choices, instructions, and messages to the user 114 via the telephone link 116.

The user 114 manipulates the input mechanism of the telephone 104 to transmit commands and information to the service provider unit 108 via the telephone link 116. For purposes of discussion, it is assumed that the telephone 104 includes a touch tone keypad. The telephone 104 transmits a DTMF signal over the telephone link 116 each time that a key on the keypad is pressed. Thus, in this embodiment, the user 114 presses the keys on the telephone 104's keypad to transmit commands and information to the service provider unit 108 via the telephone link 116.

The service provider unit 108 includes an input processor 110 to initially process the signals received from the telephone 104 over the telephone link 116. The input processor 110 processes the signals and creates, for each received DTMF signal, an entry having two components: (1) the key on the telephone 104's keypad that was pressed to generate the signal; and (2) the length of time (or duration) that this key was pressed. These entries are transferred to service processors 112, 113 (described below). The input processor 110 is discussed in greater detail below.

The service processors 112, 113 each provide a service. For example, the service provider unit 108 includes a calculator service processor 112 which provides a mathematical calculator service. The calculator service processor 112 is discussed in detail below.

The input processor 110 transfers the entries that it generates (from DTMF signals received over telephone link 116) to the service processor 112, 113 associated with the telephone link 116. As noted above, the user 114 originally established the telephone link 116 between the user 114 and the service provider unit 108 by dialing a telephone number associated with one of the service processors 112, 113. This service processor 112, 113, called the destination service processor, is associated with the telephone link 116. The destination service processor interprets and processes these entries in an application specific manner to thereby provide the user 114 with the service that he/she desired.

Implementation of the Invention

Figure 2:
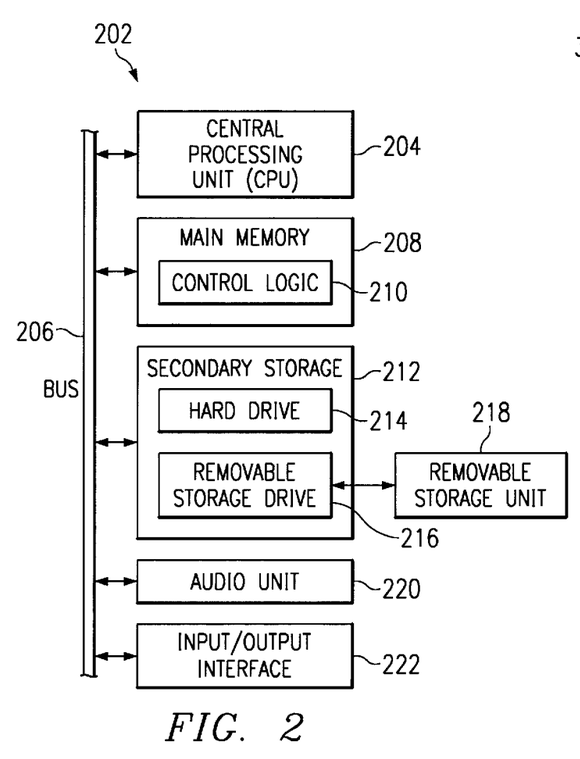
FIG. 2 is a block diagram of a computer system useful for implementing components of the present invention.

The service provider unit 108 is preferably implemented using a computer system, such as computer system 202 shown in FIG. 2. Alternatively, the service provider unit 108 comprises a plurality of computer systems, each like computer system 202. In this alternate embodiment, the input processor 110 is one computer system, and the service processors 112, 113 are each another computer system. In another embodiment, multiple service processors 112, 113 are implemented using a single computer system. Other distributions of the input processor 110 and service processors 112, 113 among computer systems are within the scope and spirit of the present invention.

The computer system 202 includes one or more processors, such as central processing unit (CPU) 204. The processor 204 is connected to a communication bus 206.

The computer system 202 also includes a main memory 208, preferably random access memory (RAM). Control logic 210 (i.e., software) is stored in the main memory 208.

The computer system 202 also includes secondary storage 212. The secondary storage 212 includes, for example, a hard disk drive 214 and/or a removable storage drive 216, representing a floppy disk drive, a magnetic tape drive, a compact disk drive, etc. The removable storage drive 216 reads from and/or writes to a removable storage unit 218 in a well known manner.

Removable storage unit 218, also called a program storage device or a computer program product, represents a floppy disk, magnetic tape, compact disk, etc. As will be appreciated, the removable storage unit 218 includes a computer usable storage medium having stored therein computer software and/or data.

Computer programs (also called computer control logic) are stored in main memory 208 and/or the secondary storage 212. Such computer programs, when executed, enable the computer system 202 to perform the features of the present invention as discussed herein. In particular, the computer programs, when executed, enable the CPU 204 to perform the features of the present invention. Accordingly, such computer programs represent controllers of the computer system 202.

The computer system 202 also includes an audio unit 220, such as a speech synthesizer, recording output device, etc. The computer system 202 utilizes the audio unit 220 to transmit audible signals to the telephone 104 over the telephone link 116 in a well known manner.

The computer system 202 further includes an input/output interface 222 for interacting with external devices. For example, the input/output interface 222 enables the computer system 202 to connect to the telephone network 106.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, computer system 202 is appropriately integrated with a telecommunications switch in order to process calls from telephone link 116 at, or in close proximity to the switch.

In yet another embodiment, the invention is implemented primarily in hardware using, for example, one or more state machines. Implementation of these state machines so as to perform the functions described herein will be apparent to persons skilled in the relevant art(s).

Operation of the Input Processor

Figure 3:
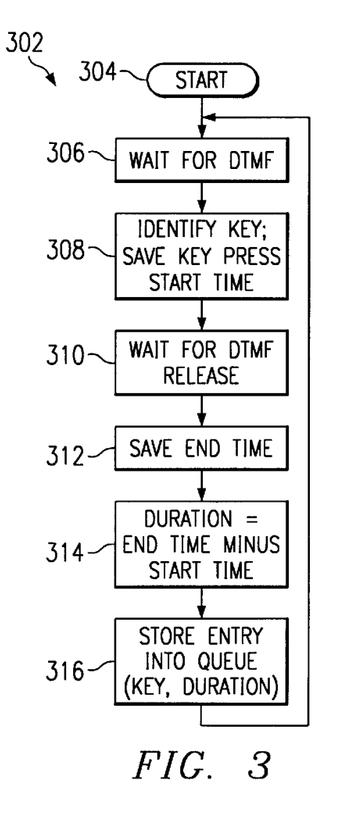
FIG. 3 is a flowchart representing the preferred operation of an input processor when receiving telephone signals.

FIG. 3 is a flowchart 302 representing the operation of the input processor 110. For illustrative purposes, flowchart 302 shall be described in the context of the input processor 110 processing DTMF signals received from the telephone 104 via telephone link 116. Assume that, in this example, the destination service processor is the calculator service processor 112. Flowchart 302 begins with step 304, where control immediately passes to step 306.

In step 306, the input processor 110 waits for a DTMF signal over the telephone link 116. A DTMF signal is transmitted by the telephone 104 to the service provider unit 108 over the telephone link 116 when the user 114 presses a key on the telephone 104's keypad. Specifically, the telephone 104 begins to transmit a DTMF signal when the user 114 presses the corresponding key on the keypad, and continues to transmit the DTMF signal until the user 114 releases the key.

Control passes to step 308 when the input processor 110 receives a DTMF signal. In step 308, the input processor 110 identifies the key that was pressed on the telephone 104's keypad to generate the received DTMF signal. This key is called the identified key. Each key on the telephone keypad is assigned a well known frequency. The input processor 110 performs step 308 in a well known manner by reference to the received signal's frequency. (Herein, the identified key is also called the symbol associated with the signal received from the telephone 104. The term "symbol" is in some ways more accurate that the term "key," since the telephone 104's dialing mechanism may be something other than a keypad. For illustrative purposes, however, it is assumed that the telephone 104's dialing mechanism is a keypad. Accordingly, the term "key" shall continue to be used, as it is accurate in this example embodiment.)

Also in step 308, the input processor 110 records the time at which the input processor 110 first began receiving the DTMF signal. This time is called the Start Time.

In step 310, the input processor 110 waits until the DTMF signal is released (i.e., until the DTMF signal ends). This corresponds to the user 114 releasing the key on the telephone 104's keypad.

In step 312, the input processor 110 records the time at which the DTMF signal was released. This time is called the Stop Time.

In step 314, the input processor 110 calculates the duration of the received DTMF signal as follows: Duration=Stop Time−Start Time. This Duration represents the length of time that the user 114 pressed the key on the telephone 104 that generated the DTMF signal.

In step 316, the input processor 110 creates an entry that includes information identifying: (1) the identified key; and (2) the duration of the DTMF signal. The input processor 110 stores this entry in a buffer or file associated with the destination service processor, which in the current example is the calculator service processor 112. This buffer or file is preferably managed in a well known manner as a first-in first-out (FIFO) queue. Control then returns to step 306.

Preferably, the input processor 110 includes a process or thread for each active telephone link, such as telephone link 116.

Operation of the Service Processor

Figure 5A:
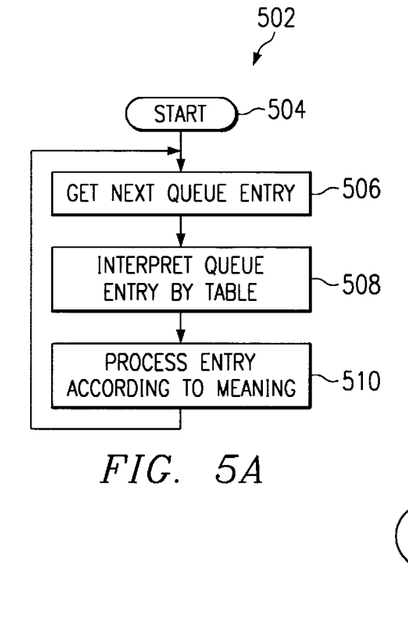
FIG. 5A is a flowchart representing the preferred operation of a service processor.

FIG. 5A is a flowchart 502 representing the generic operation of the service processors 112, 113. For illustrative purposes, flowchart 502 is described with reference to the calculator service processor 112, although it should be understood that all service processors 112, 113 generally operate in the same way. Flowchart 502 begins with step 504, where control passes to step 506.

In step 506, the calculator service processor 112 accesses a FIFO queue associated with it and retrieves the next entry contained in the queue (as discussed above, the entries in the FIFO queue were generated by the input processor 110). Each queue corresponds to a user, such as user 114, wishing to access the service(s) provided by the calculator service processor 112. In practice, multiple instances of the calculator service processor 112 may simultaneously exist, where each instance processes the entries in one of the queues associated with the calculator service processor 112.

In an alternative embodiment, a single instance of the calculator service processor 112 may feed off of more than one queue. In such an embodiment, the queue entry would have at least one additional field identifying the telephone link 116 so that calculator service processor 112 output is directed to the appropriate user 114.

In step 508, the calculator service processor 112 interprets the entry retrieved in step 506 according to a translation table. Interpretation of the entries generated by the input processor 110 is specific to the various service processors 112, 113. Generally speaking, a service processor 112, 113 interprets an entry according to two factors: (1) the key on the telephone keypad that was pressed to generate the DTMF signal associated with the entry; and (2) the duration of the DTMF signal.

Figure 4A:
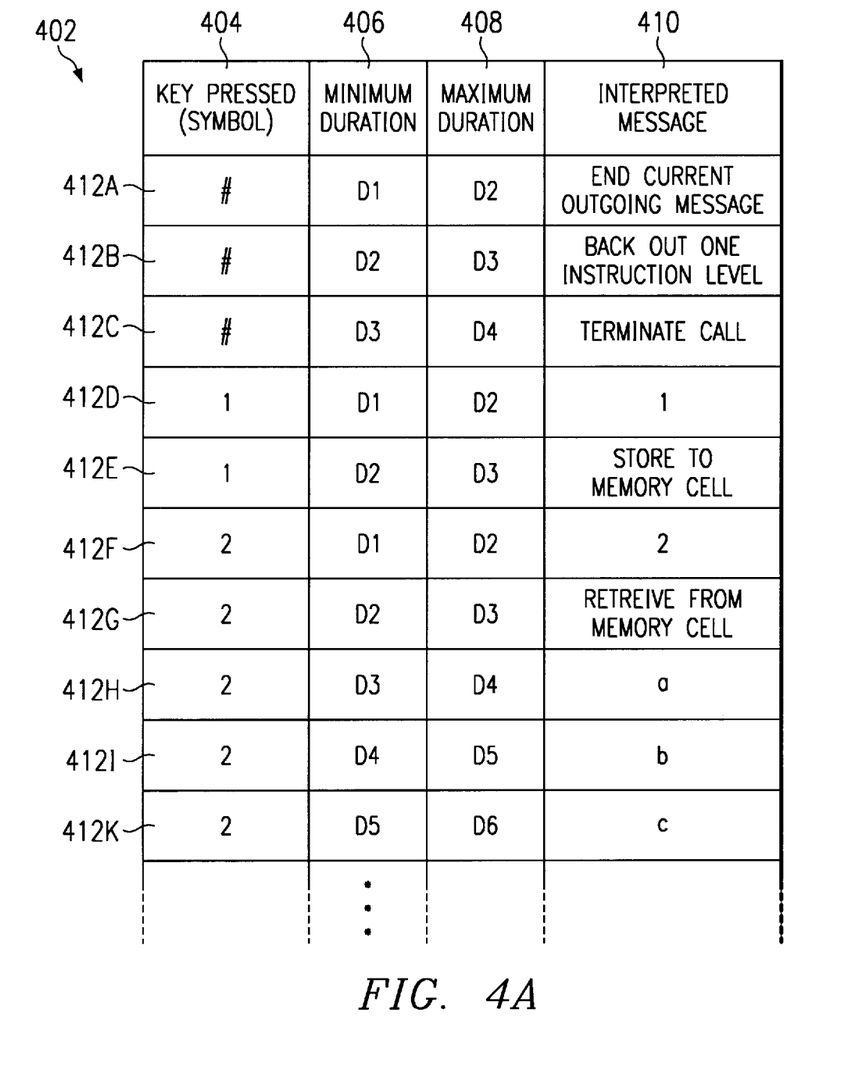
FIG. 4A illustrates an example translation table.

Preferably, the calculator service processor 112 interprets the retrieved entry by reference to the translation table, such as the example translation table 402 shown in FIG. 4A. The translation table 402 is a database table that is maintained in memory, such as main memory 208 and/or secondary storage 212.

The translation table 402 stores a set of semantics. A semantic is a rule that defines how an entry (retrieved in step 506) is to be interpreted. As discussed above, an entry identifies: (1) a key; and (2) a duration. Accordingly, a semantic is a rule that defines how a key/duration combination is to be interpreted. Different service processors 112, 113 typically support different semantics. The scope and nature of the semantics depend on the respective services that they provide. Accordingly, preferably each service processor 112, 113 includes a translation table 402.

The translation table 402 includes a plurality of rows 412. Each row corresponds to a semantic. Each row includes a key pressed column 404, a minimum duration column 406, a maximum duration column 408, and an interpreted message column 410. The key pressed column 404 identifies a key from a telephone's touch tone keypad. The minimum duration column 406 and maximum duration column 408 identify a duration range.

The interpreted message column 410 identifies a message that the service processor 112, 113 (associated with the translation table 402) supports and recognizes. A message may be a symbol, such as an alphabetic or numeric character. A message may also be a command, such as "Terminate Service" or "multiply." A message may also be any other communication that the service processor 112, 113 supports.

Accordingly, a semantic associates a message with a key/duration combination. An entry (retrieved in step 506) matching a semantic's key and duration is translated to the semantic's message. For example, if an entry's key is "2", and the entry's duration falls within the range D2 to D3, then the meaning of the entry is interpreted to be "retrieve from memory cell" (see semantic 412G in translation table 402). In other words, if the user 114 pressed the 2 key for a duration between D2 and D3, then it is assumed that the user 114 meant to transmit a "retrieve from memory cell" command to the service provider unit 108 over the telephone link 116.

Thus, referring again to FIG. 5, in step 508 the calculator service processor 112 interprets the entry retrieved in step 506 by searching through the translation table 402 until it finds a semantic 412 (called the matching semantic) having a key and duration range that matches the retrieved entry's key and duration. The calculator service processor 112 then interprets (or translates) the retrieved entry as indicated by the interpreted message column 410 in the matching semantic.

In step 510, the calculator service processor 112 processes the message obtained in step 508. Such processing is service processor specific. Control then returns to step 506.

Figure 5B:
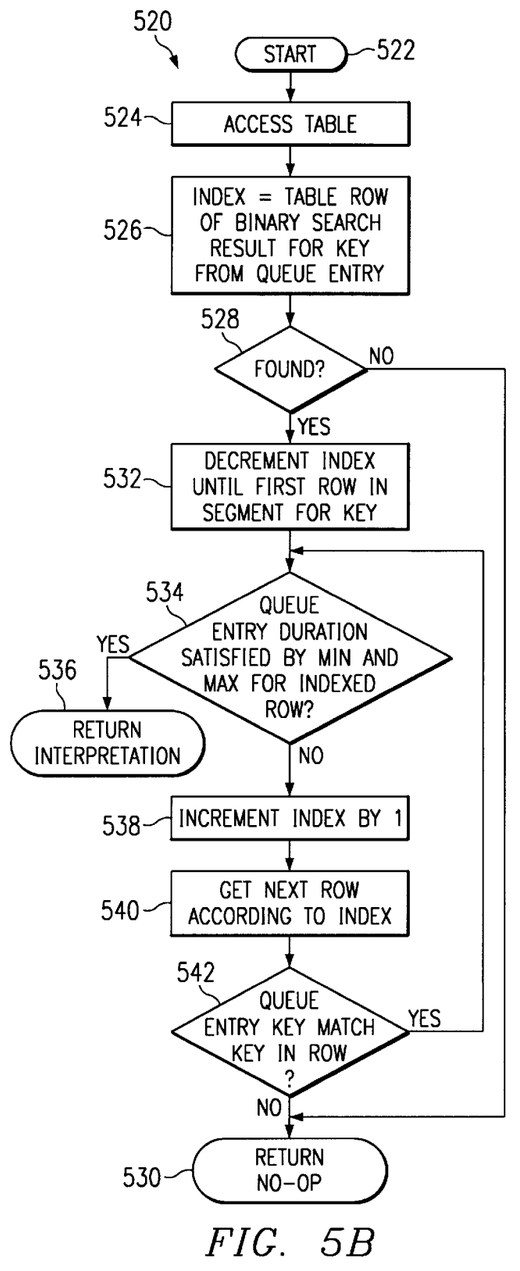
FIG. 5B is a flowchart representing the preferred operation of queue entry interpretation.

Operation of step 508 is represented by a flowchart 520 in FIG. 5B. For illustrative purposes, flowchart 520 is described with reference to the calculator service processor 112, although it should be understood that all service processors 112, 113 generally operate in the same way. Flowchart 520 begins with step 522, where control immediately passes to step 524.

In step 524, the calculator service processor 112 accesses the translation table 402.

In step 526, the calculator service processor 112 locates a segment in the translation table 402 comprising rows that match the key corresponding to the queue entry retrieved in step 506. For example, suppose that the key is "2." The segment in the translation table 402 that matches this key includes rows 412F, 412G, 412H, 412I, and 412K, each of which stores "2" in the key pressed field 404.

The calculator service processor 112 preferably performs step 526 by performing a well known binary search. The binary search operates by selecting the middle row in the translation table. If the translation table has 10 rows, then the middle row is row 5. The calculator service processor 112 then determines whether this middle row matches the key. If the row matches the key, then the calculator service processor 112 sets an Index variable to point to this row. Control then flows to step 528. If the row does not match the key, then the calculator service processor 112 determines whether the key value in the row is less than or greater than the key (recall that the rows in the translation table 402 are sorted by key). If the row is less than the key, then the calculator service processor 112 repeats the above process with the rows above the middle row. If the row is greater than the key, then the calculator service processor 112 repeats the above process with the rows below the middle row. This process is completed until a matching row is found, or all rows have been processed (with no match).

In step 528, the calculator service processor 112 determines whether a matching row (that matched the key in the entry retrieved in step 506) was found in step 526. If a matching row is not found, then the calculator service processor 112 returns a no-op in step 530 (essentially ignoring the entry). Otherwise, step 532 is performed.

In step 532, the calculator service processor 112 decrements the Index variable until it points to the first row in the translation table 402 that matches the key in the entry retrieved in step 506. For example, suppose that the key is "2," and in step 526 the calculator service processor 112 set the Index variable to point to row 412H. In step 532, the calculator service processor 112 decrements the Index variable until it points to row 412F.

In step 534, the calculator service processor 112 determines whether the duration indicated by the row pointed at by the Index variable matches the duration of the entry retrieved in step 506 (i.e., the queue entry duration falls within the duration range specified in the row pointed at by the Index variable). If there is a match, then the calculator service processor 112 in step 536 returns the message in the interpreted message field 410 of the row pointed to by the Index variable. Flowchart 520 is then complete. If there is not a match, then step 538 is performed.

In step 538, the calculator service processor 112 increments the Index variable.

In step 540, the calculator service processor 112 retrieves the row pointed to by the Index variable.

In step 542, the calculator service processor 112 determines whether this row matches the queue entry's key. If the row matches the queue entry's key, then control flows to step 534. Otherwise, the calculator service processor 112 in step 530 returns a no-op.

Steps 534, 538, 540, and 542 define an iterative loop which finds the first row (in the segment for a particular key) in translation table 402 with a duration range which matches the duration in the queue entry retrieved in step 506. Note that table 402 may intentionally define overlapping duration ranges for a particular key pressed. A segment of rows for a particular key pressed is searched sequentially until a match is found. Translation table 402 preferably causes execution of step 536. Therefore, there is preferably a "catch all" row in each key's segment which defines a minimum duration 406 of 0 with a maximum duration 408 which is very large. Such a catch all row would enforce a semantic and prevent execution of step 530. Of course, a no-op may be desirable through step 530 execution.

Figure 4B:
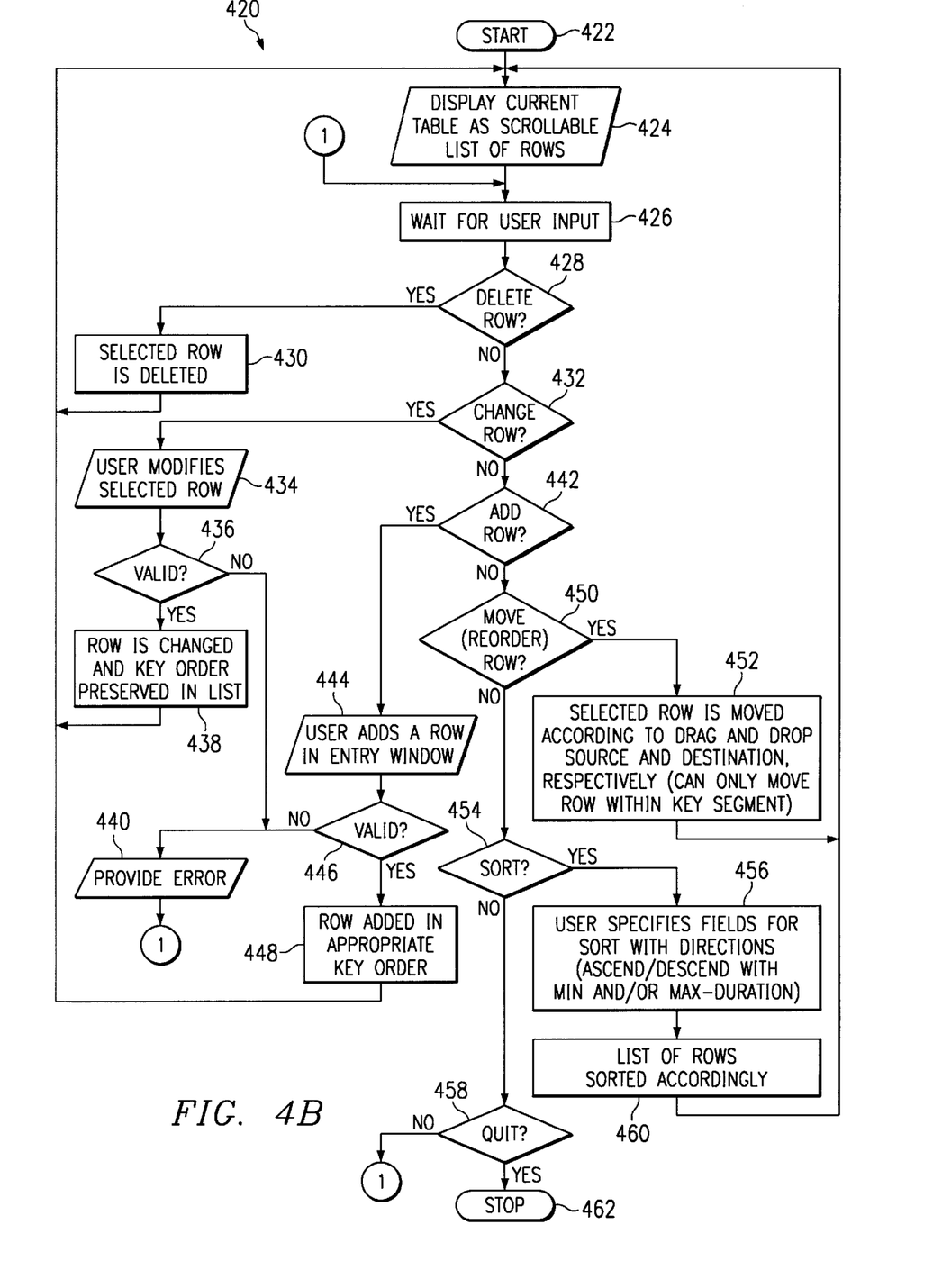
FIG. 4B is a flowchart representing the preferred operation of an administration interface for maintaining the translation table of FIG. 4A.

Flowchart 420 in FIG. 4B, referred to as the translation table configuration, represents the manner in which the translation table 402 is modified by an administrator (called a user). Flowchart 420 is preferably a software process which executes in a data processing system with access to translation table 402 at service provider unit 108, and having a graphic user interface (GUI) to enable maintenance of translation table 402. An alternative embodiment would be an automated telephone service interface to maintain table 402. Flowchart 420 begins with step 422, where control immediately passes to step 424.

In step 424, the translation table 402 is displayed in a row list form (preferably in a scrollable window).

In step 426, a translation table configurator (TTC) waits for user input. Step 428 is received after user input is received.

In step 428, the TTC determines whether the user input represents a delete row operation. If the user input indicates a delete row operation, then in step 430 the TTC deletes the row in the translation table 402 that was previously selected by the user (using well known procedures, such as selecting with a mouse). Control then flows to step 424. If the user input does not indicate a delete row operation, then step 432 is performed.

In step 432, the TTC determines whether the user input indicates a change row operation. If the user input indicates a change row operation, then in step 434 the TTC enables the user to modify one of the rows of the translation table 402. The user modifies a row in a well known manner. In step 436, the TTC determines whether the user's modifications are valid. For example, the TTC may check to ensure that the key entered by the user is a valid telephone keypad key. If the modifications are not valid, then in step 440 the TTC provides an error to the user. Control then flows to step 426. If the modifications are valid, then in step 438 the TTC stores the changes. In storing the changes, the TTC preserves the sorted ordering of the translation table 402 by key. Control then flows to step 424.

If in step 432 the TTC determined that the user input did not indicate a change row operation, then step 442 is performed. In step 442, the TTC determines whether the user input indicates an add row operation. If the user input indicates an add row operation, then in step 444 the TTC enables a user to add a row to the translation table 402. In step 446, the TTC determines whether the information entered by the user is valid. If the information is not valid, then in step 440 the TTC provides an error to the user. Control then flows to step 426. If the information is valid, then in step 448 the TTC stores the row and the information. In storing the row and information, the TTC preserves the sorted ordering of the translation table 402 by key. Control then flows to step 424.

If in step 442 the TTC determined that the user input did not indicate an add row operation, then step 450 is performed. In step 450, the TTC determines if the user input indicates a move (reorder) row operation. If the user input indicates a move row operation, then the TTC in step 452 allows a user to move a row within a key segment using a well known drag and drop procedure. For example, the user could move row 412I in FIG. 4 anywhere in the "2" key segment formed by rows 412F, 412G, 412H, 412I, and 412K. Control then flows to step 424. If the user input did not indicate a move row operation, then step 454 is performed.

In step 454, the TTC determines whether the user input indicates a sort operation. If the user input indicates a sort operation, then the TTC in step 456 enables the user to enter fields on which to sort on, and then the sort is performed in step 460. Control then flows to step 424. The user can only sort on rows within key segments. Overall, the translation table 402 remains sorted by key. If the user input does not indicate a sort operation, then step 458 is performed.

In step 458, the TTC determines whether the user input represents a quit operation. If the user input does not represent a quit operation, then control returns to step 426 for further monitor of user input. Otherwise, operation of flowchart 420 is complete, as indicated by step 462.

The operation of the service processors 112, 113 will be clearer by reference to the Telephone Calculator Embodiment section below, wherein the specific operation of the calculator service processor 112 is discussed.

Telephone Calculator Embodiment

The calculator service processor 112 provides a mathematical calculator service. This calculator service enables the user 114 to use the telephone 104 to perform mathematical operations. The calculator service is very useful when the user 114 has a need to perform mathematical calculations, but does not have access to a computer or calculator. The calculator service is also very useful when the user 114 has a need to perform mathematical calculations, and has access to a computer or calculator, but is in a situation where it would be inconvenient, impossible, or unsafe to use the computer or calculator (such as when driving a car).

In some embodiments, the calculator service is a free service. In other embodiments, the calculator service is a pay-to-dial service (such as a 900 service).

Translation Table

The translation table 402 in FIG. 4A is an example of a partial translation table associated with the calculator service processor 112. Table 1 below presents a complete translation table for the calculator service processor 112 according to an embodiment of the invention.

Other embodiments may include more or less calculator functions, such as SIN, COS, TAN, LOG, LN, or any other well known calculator function.

The lengths of durations D1, D2, and D3 are implementation dependent. Preferably, duration D1 is less than duration D2, which is less than duration D3. Accordingly, the semantics in Table 1 essentially have either a short duration (between D1 and D2) or a long duration (between D2 and D3). However, the present invention is designed to accommodate any number of semantics for any particular key. The additional calculator functions mentioned above can be accommodated by adding a third duration (such as D3 to D4) to Table 1. The invention supports any number of duration ranges as shown in the example translation table 402 of FIG. 4A.

For this example, note that semantics that translate to digits have short durations. Semantics that translate to commands (other than the Quit Command and the decimal point) have long durations.

In some embodiments, the depression of multiple keys are used to designate a command, message, symbol, etc. For example, the depression by the user 114 of "*" (for the proper duration, if duration sensitive) followed by "3" (for the proper duration, if duration sensitive) may denote the addition operation.

TABLE 1

| Key Pressed | Minimum Duration | Maximum Duration | Interpreted Message |
|---|---|---|---|
| # | D1 | D2 | Terminate Call |
| # | D2 | D3 | Clear Work and Start Anew |
| * | D1 | D2 | Decimal Point |
| * | D2 | D3 | Equals with confirmation |
| 0 | D1 | D2 | 0 |
| 0 | D2 | D3 | Equals |
| 1 | D1 | D2 | 1 |
| 1 | D2 | D3 | Store to memory cell |
| 2 | D1 | D2 | 2 |
| 2 | D2 | D3 | Retrieve from memory cell |
| 3 | D1 | D2 | 3 |
| 3 | D2 | D3 | Add |
| 4 | D1 | D2 | 4 |
| 4 | D2 | D3 | Subtract |
| 5 | D1 | D2 | 5 |
| 5 | D2 | D3 | Multiply |
| 6 | D1 | D2 | 6 |
| 6 | D2 | D3 | Divide |
| 7 | D1 | D2 | 7 |
| 7 | D2 | D3 | % |
| 8 | D1 | D2 | 8 |
| 8 | D2 | D3 | Square root |
| 9 | D1 | D2 | 9 |
| 9 | D2 | D3 | 1/x |

Variable Space

The calculator service processor 112 uses a number of variables. These variables collectively represent a variable space 902 of the calculator service processor 112 (see FIG. 9). These variables may reside in main memory 208 and/or secondary storage 212.

Figure 9:
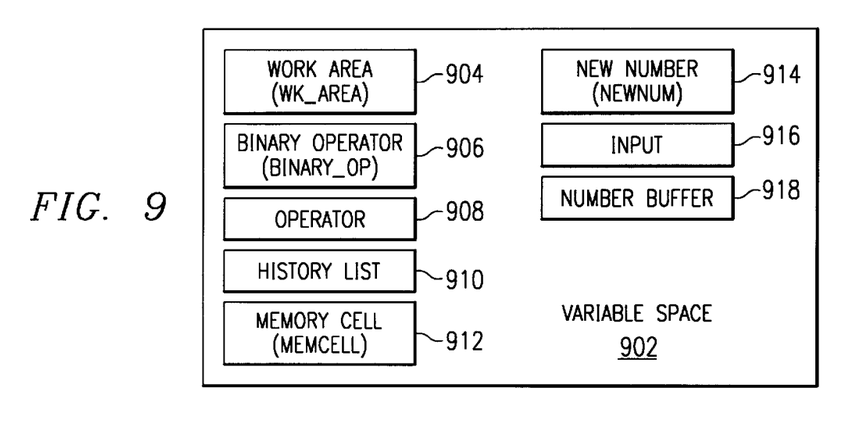
FIG. 9 illustrates a variable space associated with the calculator service processor.

The variable space 902 includes a Work Area 904, a Binary Operator flag 906, an Operator 908, a History List 910, a Memory Cell 912, a New Number flag 914, an Input 916, and a Number Buffer 918. These are discussed below.

Operation of the Calculator Service Processor—Receiving Input From Users

The operation of the calculator service processor 112 shall now be described with reference to a flowchart 602 in FIG. 6. Flowchart 602 begins with step 604, where control immediately passes to step 606.

In step 606, the calculator service processor 112 accepts a call from user 114. Specifically, the user 114 in step 606 dials a telephone number associated with the calculator service provided by the calculator service processor 112. The telephone link 116 is established between the telephone 104 and the service provider unit 108 in a well known manner. Responsibility for processing the user 114's call is assumed by the calculator service processor 112 when it accepts the call.

In steps 608 and 610, the calculator service processor 112 performs initialization tasks. In particular, the calculator service processor 112 sets a variable, called the Work Area 904 (WK_AREA), to zero. The Work Area 904 stores the result of the most recent calculation. The Work Area 904 is an equivalent metaphor to the display of a calculator.

The calculator service processor 112 sets a boolean flag, called Binary Operator flag 906 (or BINARY_OP), to FALSE. The Binary Operator flag 906 keeps track of whether a binary operation is in progress. A binary operation is an operation that requires two operators, such as the addition operation. The Binary Operator Flag 906 allows a user friendly interface to the calculator for binary operations.

The calculator service processor 112 also sets an Operator variable 908 to Equal. The Operator variable 908 indicates the last operation that the user 114 input.

The calculator service processor 112 sets a History List 910 to empty. The History List 910 is preferably a list (implemented as a linked list, for example) of codes recognizable and supported by the audio unit 220.

The codes stored in the History List 910 are representations of the mathematical symbols comprising the calculation in progress. For example, suppose that the user 114 has input the following partial calculation: "1+2+". The History List 910 stores a code for each of the four mathematical symbols in this partial calculation. These codes are stored in the order in which the corresponding symbols appear in the calculation.

As noted above, these codes are recognizable and supported by the audio unit 220. Accordingly, if the History List 910 is provided to the audio unit 220, then the audio unit 220 is caused to audibly annunciate (or annotate) the current calculation to the user 114 over the telephone link 116 via the telephone 104. In other words, the audio unit 220 upon receipt of the History List 910 audibly annunciates the following: "one plus two plus". In this manner, the user 114 can audibly review the calculation in progress.

Unlike conventional calculators and computers, the user 114 is not required to look at a display to review the current calculation. Thus, the invention is very useful in situations where it would be impossible, inconvenient, or unsafe for the user 114 to use a calculator or computer, such as while driving a car.

In step 610, the calculator service processor 112 sets a variable, called Memory Cell 912 (or MEMCELL), to zero. The Memory Cell 912 is a storage location that is accessible to the user 114.

In step 612, the calculator service processor 112 via the audio unit 220 audibly annunciates a brief greeting to the user 114, such as "Welcome to the telephone calculator service." The calculator service processor 112 also audibly provides the user 114 with a menu of choices, such as "Press 1 to access the calculator, and press 2 to receive instructions."

In step 614, the calculator service processor 112 determines in a well known manner whether the user 114 pressed the 2 key. If the user 114 pressed the 2 key, then in step 616 the calculator service processor 112 audibly provides the user 114 with instructions for using the calculator service (these instructions may be a brief summary of the description contained herein). Preferably, information from the translation table 402 is provided to the user 114. If the user 114 did not press the 2 key, then control flows to step 618.

In step 618, the calculator service processor 112 audibly provides the user 114 with a ready greeting, such as "Please enter your calculation."

In step 620, the calculator service processor 112 sends a message to the input processor 110, instructing the input processor 110 to begin receiving signals over telephone link 116. The calculator service processor 112 further instructs the input processor 110 to store the entries that it generates from these received signals in a queue assigned to the calculator service processor 112.

In response to this message from the calculator service processor 112, the input processor 110 in step 620 receives signals from the telephone 104 over the telephone link 116. The input processor 110 generates entries from these received signals, and stores these entries in the queue designated by the calculator service processor 112. The operation of the input processor in step 620 is represented by flowchart 302 in FIG. 3 (discussed above). Operation of flowchart 602 is complete after step 620 is performed, as indicated by step 622.

Figure 6:
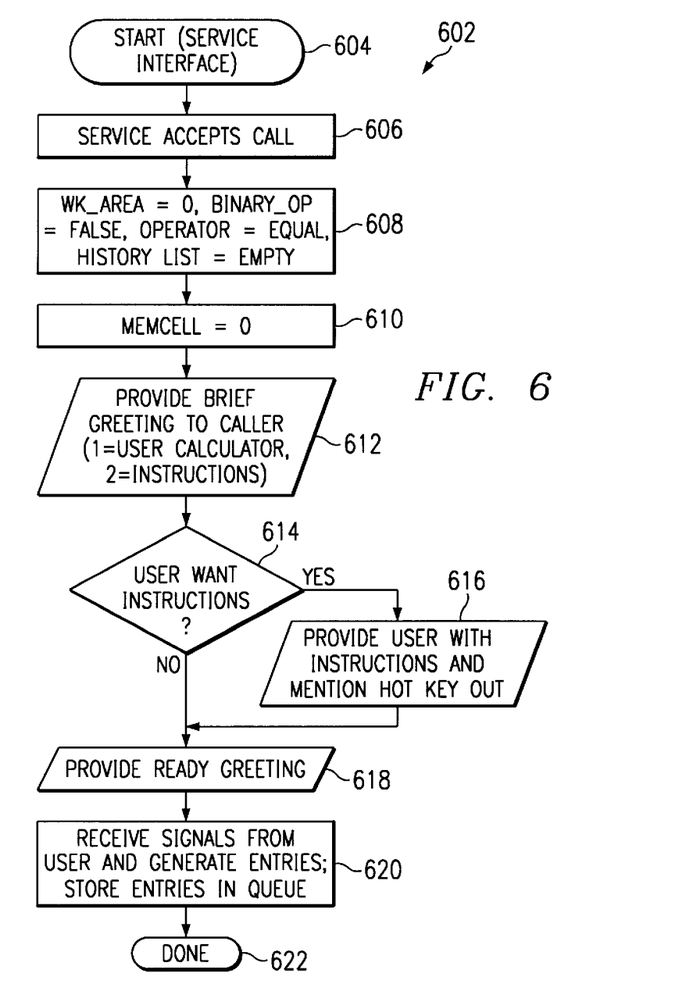
FIGS. 6, 7, and 8 are flowcharts representing the preferred operation of a calculator service processor.
Figure 7:
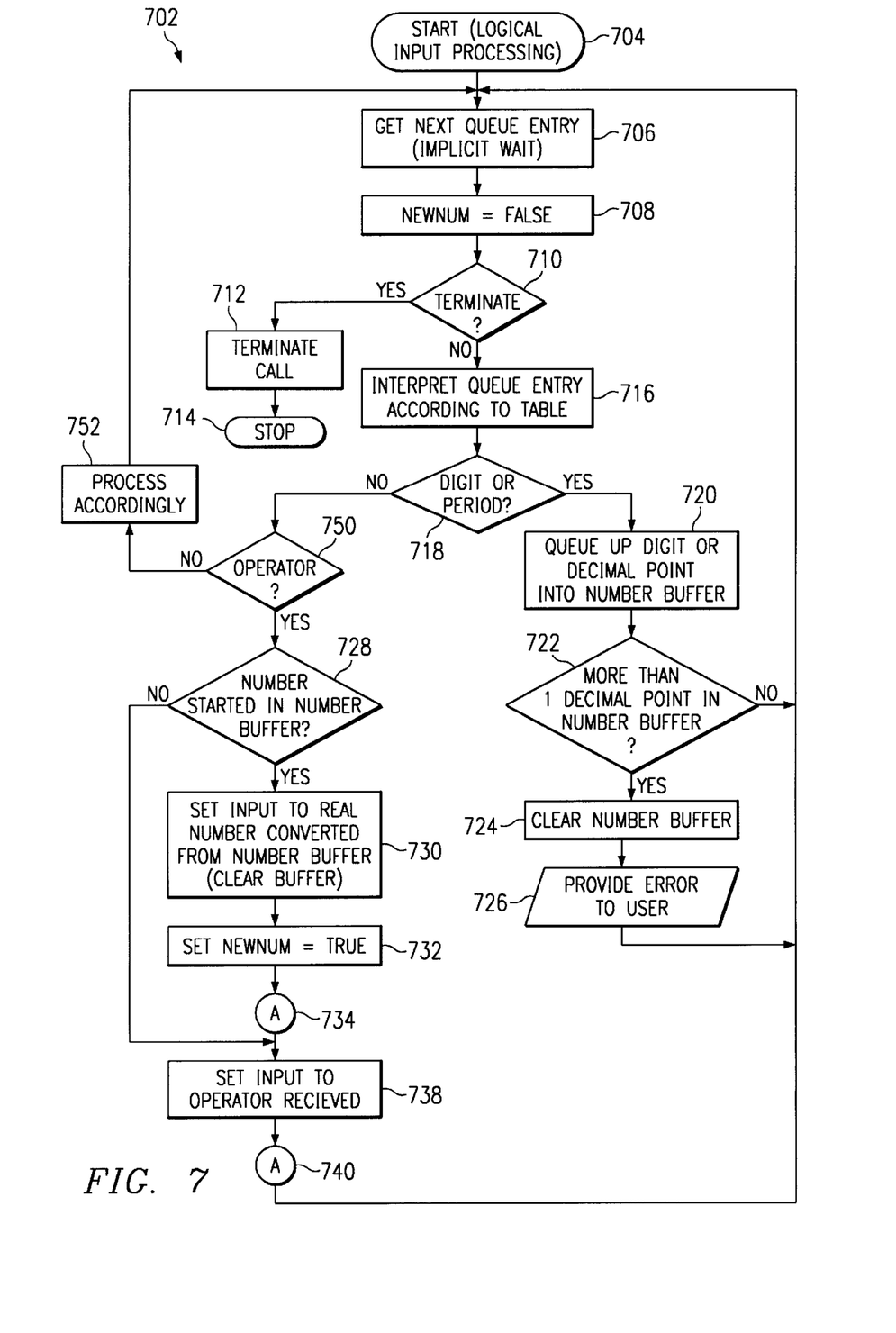

Operation of the Calculator Service Processor—Processing Input Received From Users FIG. 7 illustrates a flowchart 702 that represents the manner in which the calculator service processor 112 processes the input received from the user 114 (as represented by flowchart 602 in FIG. 6). Preferably, flowcharts 602 and 702 are performed in parallel (they may each represent a different thread or process, for example). Flowchart 702 begins with step 704, where control immediately flows to step 706.

In step 706, the calculator service processor 112 retrieves the next entry from the queue. If no entries are contained in the queue, then the calculator service processor 112 waits in step 706 (alternatively, a well known interrupt servicing scheme can be used). Step 708 is performed after the calculator service processor 112 has retrieved an entry from the queue (this entry is called the current entry for reference purposes).

In step 708, the calculator service processor 112 sets a boolean variable called New Number 914 (or NEWNUM) to False. New Number 914 indicates whether the user 114 is in progress of entering a number to be used in a current calculation.

In step 710, the calculator service processor 112 determines whether the current entry translates to a service termination command. A service termination command is a special queue entry to terminate processing. For example, if the user 114 hangs up, the calculator service processor 112 places the special queue entry into the FIFO queue so processing is terminated. If the current entry translates to the service termination command, then in step 712 the calculator service processor 112 terminates the call by terminating the telephone link 116. The calculator service processor 112 also instructs the input processor 110 to discontinue waiting on telephone link 116. Operation of flowchart 702 is then complete, as indicated by step 714.

If in step 710 the calculator service processor 112 determined that the current entry does not translate to the service termination command, then step 716 is performed.

In step 716, the calculator service processor 112 interprets the current entry by reference to the translation table (see Table 1, above). In particular, the calculator service processor 112 searches through the translation table until it finds a row that matches the current entry's key and duration. The current entry is then translated as defined by the semantic represented by the matching row. The operation of step 716 is represented by flowchart 520 in FIG. 5B (discussed above).

In step 718, the calculator service processor 112 determines whether the interpreted (translated) current entry is equal to a digit or a period (decimal point). If the interpreted current entry is not equal to a digit or period, then step 750 is performed (discussed below). Otherwise, step 720 is performed.

In step 720, the calculator service processor 112 appends the translated digit or decimal point into a buffer called the Number Buffer 918. The Number Buffer 918 is used to hold a number that is being formed by the user 114.

In step 722, the calculator service processor 112 determines whether there are multiple decimal points in the Number Buffer 918. If there are not multiple decimal points in the Number Buffer 918, then control returns to step 706. Otherwise, step 724 is performed.

In step 724, the calculator service processor 112 clears the Number Buffer 918.

In step 726, the calculator service processor 112 audibly provides a message to the user 114, informing the user 114 that the number being formed was in error (since it had more than one decimal point). In one embodiment, the calculator service processor 112 further informs the user 114 that the number being formed has been cleared, and that the user 114 should re-enter the number. Control then returns to step 706.

If the calculator service processor 112 determined in step 718 that the interpreted current entry was not equal to a digit or a decimal point, then step 750 is performed.

In step 750, the calculator service processor 112 determines whether the interpreted current entry is equal to a calculator-related operator, such as a unary operator, a binary operator, a memory operator, clear, equals, equals with confirmation, etc. If the interpreted current entry is not an operator, then the calculator service processor 112 assumes that the interpreted current entry is either equal to some other meaning defined in the translation table, or equal to a no-op. A no-op implies no hits were found in the translation table and the input is therefore ignored. In either case, the calculator service processor 112 appropriately processes the command (step 752), and returns to step 706.

If the calculator service processor 112 determines in step 750 that the interpreted current entry is equal to a calculator-related operator, then step 728 is performed.

In step 728, the calculator service processor 112 determines whether the user 114 has previously begun entering a new number for use in a current calculation. The calculator service processor 112 performs step 728 by determining whether the Number Buffer 918 is cleared. If the Number Buffer 918 is cleared, then the user 114 has not begun entering a number, and step 738 is performed (discussed below). If the Number Buffer 918 is not cleared, then the user 114 has previously begun to enter a number, and step 730 is performed.

In step 730, the calculator service processor 112 converts the number in the Number Buffer 918 to a real number using well known techniques. The calculator service processor 112 sets an Input variable 916 equal to this real number. This real number represents an operand to the current calculation, for example 978.32. The calculator service processor 112 then clears the Number Buffer 918.

In step 732, the calculator service processor 112 sets the New Number flag 914 equal to True, indicating that the user 114 has entered a number for use in the current calculation. Control then flows to step 734, represented by a flowchart 802 in FIG. 8 (discussed below). Upon completion of step 734, control passes to step 738.

Step 738 is also performed if, in step 728, the calculator service processor 112 determined that the user 114 had not previously begun entering a new number for use in the current calculation. In step 738, the calculator service processor 112 sets the Input variable 916 equal to the command or operator as determined by step 716.

Step 740 is then performed. The operation of step 740 is represented by flowchart 802 in FIG. 8. Upon completion of step 740, control returns to step 706. Flowchart 802 shall now be discussed.

Figure 8A:
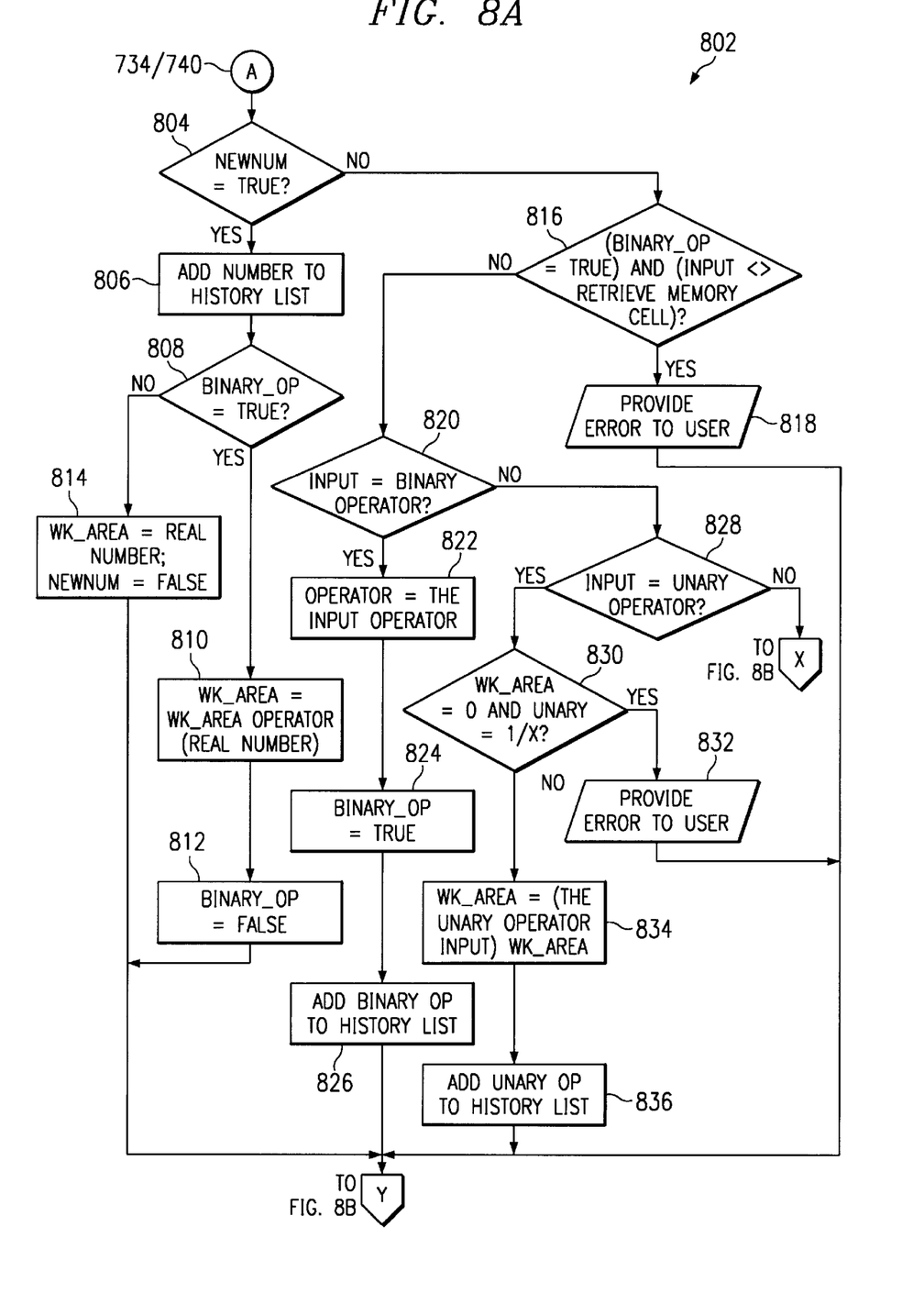
Figure 8B:
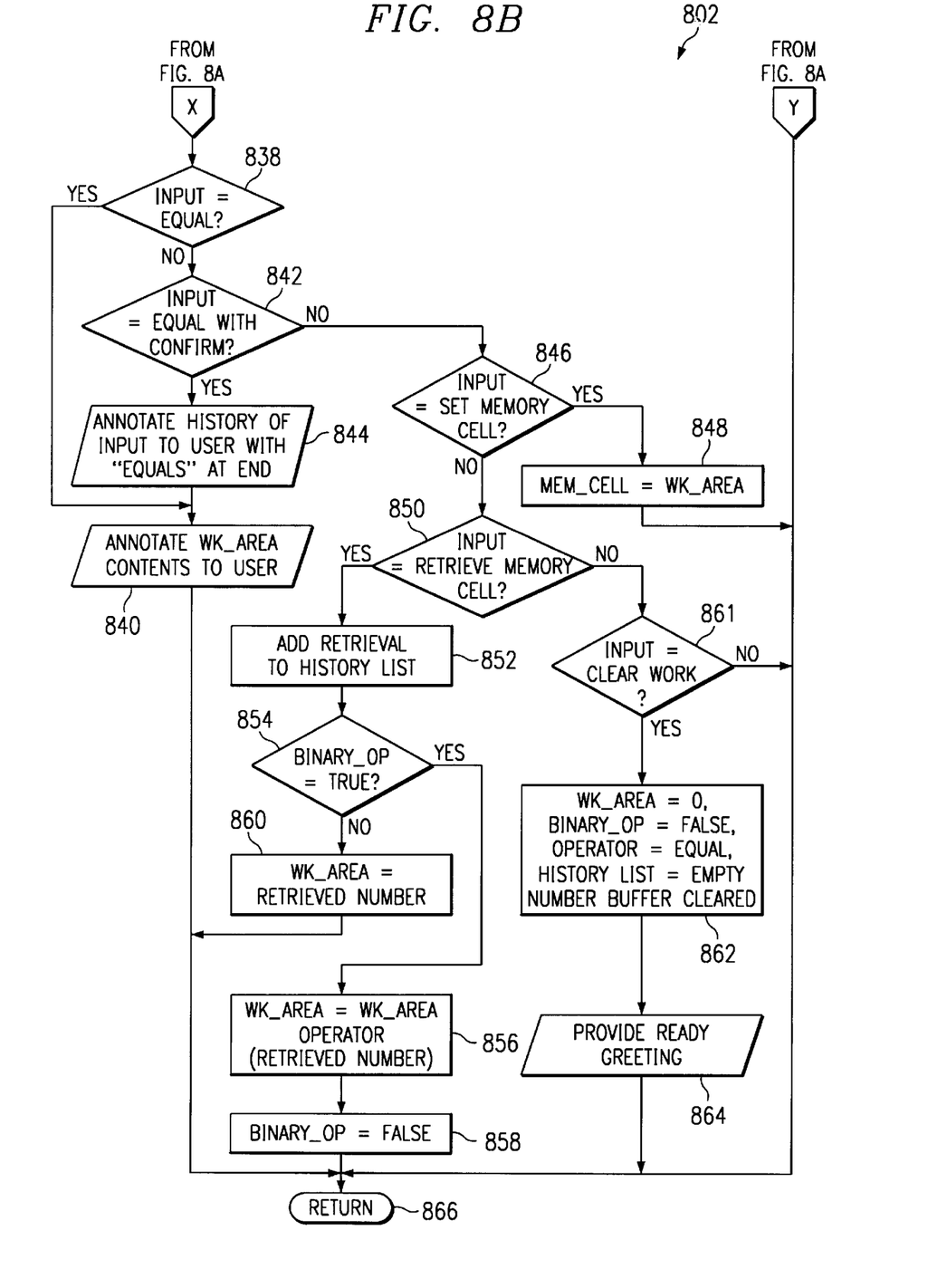

In step 804, the calculator service processor 112 determines whether the user 114 has entered a new number for use in a current calculation by determining whether the New Number flag 914 is equal to True. If the user 114 has not entered a new number, then step 816 is performed (discussed below). Otherwise, step 806 is performed.

In step 806, the calculator service processor 112 appends one or more codes to the History List 910. These codes represent the real number stored in the Input variable 916. If these codes are sent to the audio unit 220, then the audio unit 220 is caused to audibly annunciate this real number.

In step 808, the calculator service processor 112 determines whether the current calculation involves a pending binary operation. The calculator service processor 112 performs step 808 by determining whether the Binary Operator flag 906 is equal to True. If the Binary Operator flag 906 is not equal to true, then the calculator service processor 112 in step 814 sets the Work Area 904 equal to the real number in the Input variable 916, and sets the New Number flag 914 equal to False. Control then returns to flowchart 702 in FIG. 7, as indicated by step 866.

If the calculator service processor 112 in step 808 determines that the Binary Operator flag 906 is equal to true, then step 810 is performed. In step 810, the calculator service processor 112 performs the binary operation indicated by the Operator variable 908 on the real number in the Work Area 904, and the real number in the Input variable 916. The calculator service processor 112 stores the result in the Work Area 904. In step 812, the calculator service processor 112 sets the Binary Operator flag 906 equal to False. Control then returns to flowchart 702 in FIG. 7, as indicated by step 866.

If, in step 804, the calculator service processor 112 determined that the user 114 had not previously entered a number for use in the current calculation, then step 816 is performed. In step 816, the calculator service processor 112 determines whether the following is true: (1) a binary operation is currently being performed (by reference to the Binary Operation flag 906); and (2) the most recent command entered by the user 114 as stored in the Input variable 916 is not the Retrieve From Memory operation (i.e., key is equal to 2, duration is between D2 and D3; see Table 1). If these two conditions are true, then the user 114 has improperly formed a calculation. This is the case when the user 114 has requested a binary operation, but has provided only a single number for use in the binary operation.

Accordingly, if these two conditions are true, then the calculator service processor 112 in step 818 audibly conveys an error message to the user 114. Control then returns to flowchart 702 in FIG. 7, as indicated by step 866.

If, in step 816, the calculator service processor 112 determines that these two conditions are not both true, then step 820 is performed.

In step 820, the calculator service processor 112 determines whether the translated current entry (as stored in the Input variable 916) is a binary operator command, such as the multiplication command. If the translated current entry is not a binary operator command, then step 828 is performed (described below). Otherwise, step 822 is performed.

In step 822, the calculator service processor 112 sets the Operator variable 908 equal to the value of the Input variable 916 (that is, the calculator service processor 112 sets the Operator variable 908 equal to the binary operator command represented by the translated current entry).

In step 824, the calculator service processor 112 sets the Binary Operator flag 906 equal to True.

In step 826, the calculator service processor 112 appends one or more codes to the History List 910. These codes represent the binary operation command stored in the Operator variable 908. If these codes are sent to the audio unit 220, then the audio unit 220 is caused to audibly annunciate this binary operation. For example, if the Operator variable 908 stores the addition operator, then these codes when sent to the audio unit 220 causes the audio unit 220 to audibly annunciate the word "plus."

Control then returns to flowchart 702 in FIG. 7, as indicated by step 866.

If, in step 820, the calculator service processor 112 determined that the translated current entry is not a binary operator command, then step 828 is performed. In step 828, the calculator service processor 112 determines whether the translated current entry (as stored in the Input variable 916) is a unary operator, such as the 1/x command. If the translated current entry is not a unary operator, then step 838 is performed (described below). Otherwise, step 830 is performed.

In step 830, the calculator service processor 112 performs error checking. The actual error checking performed by the calculator service processor 112 is implementation dependent, and depends on the unary operations that are supported by the calculator service processor 112. In the embodiment being described, the calculator service processor 112 in step 830 depends whether the following conditions are true: (1) the Work Area 904 stores zero; and (2) the translated current entry is the 1/x unary command. If both these conditions are true, then the calculator service processor 112 in step 832 audibly conveys a divide-by-zero error message to the user 114. Control then returns to flowchart 702 in FIG. 7, as indicated by step 866.

If both these conditions are determined in step 830 to not be true, then step 834 is performed. In step 834, the calculator service processor 112 applies the unary operator indicated by the translated current entry to the real number stored in the Work Area 904. The calculator service processor 112 stores the result in the Work Area 904.

In step 836, the calculator service processor 112 appends one or more codes to the History List 910. These codes represent the unary operation command represented by the translated current entry. If these codes are sent to the audio unit 220, then the audio unit 220 is caused to audibly annunciate this unary operation. Control then returns to flowchart 702 in FIG. 7, as indicated by step 866.

If, in step 828, the calculator service processor 112 determined that the translated current entry is not a unary operator, then step 838 is performed. In step 838, the calculator service processor 112 determines whether the translated current entry (as stored in the Input variable 916) is equal to the equals command. If the translated current entry is not equal to the equals command, then step 842 is performed (described below). Otherwise, step 840 is performed.

In step 840, the calculator service processor 112 commands the audio unit 220 to audibly annunciate (i.e., annotate) to the user 114 via the telephone link 116 the contents of the Work Area 904. The calculator service processor 112 performs step 840 by transmitting to the audio unit 220 one or more codes that represent the real number stored in the Work Area 904. Control then returns to flowchart 702 in FIG. 7, as indicated by step 866.

If, in step 838, the calculator service processor 112 determined that the translated current entry was not equal to the equals command, then step 842 is performed. In step 842, the calculator service processor 112 determines whether the translated current entry (as stored in the Input variable 916) is equal to the equals with confirmation command. If the translated current entry is not equal to the equals with confirmation command, then step 846 is performed (described below). Otherwise, step 844 is performed.

In step 844, the calculator service processor 112 commands the audio unit 220 to audibly annunciate the status of the current calculation. The calculator service processor 112 performs step 844 by transferring the contents of the History List 910 to the audio unit 220. The calculator service processor 112 then commands the audio unit 220 to audibly annunciate the word "equals" by transferring appropriate code(s) to the audio unit 220. Then step 840 is performed, wherein the audio unit 220 is commanded to audibly annunciate the contents of the Work Area 904 (described above). Control then returns to flowchart 702 in FIG. 7, as indicated by step 866.

If, in step 842, the calculator service processor 112 determined that the translated current entry (as stored in the Input variable 916) is not equal to the equals with confirmation command, then step 846 is performed. In step 846, the calculator service processor 112 determines whether the translated current entry (as stored in the Input variable 916) is equal to the set memory cell command. If the translated current entry is not equal to the set memory cell command, then step 850 is performed (described below). Otherwise, step 848 is performed.

In step 848, the calculator service processor 112 sets the Memory Cell 912 equal to the value of the Work Area 904. Control then returns to flowchart 702 in FIG. 7, as indicated by step 866.

If, in step 846, the calculator service processor 112 determined that the translated current entry (as stored in the Input variable 916) is not equal to the set memory cell command, then step 850 is performed. In step 850, the calculator service processor 112 determines whether the translated current entry (as stored in the Input variable 916) is equal to the retrieve memory cell command. If the translated current entry is not equal to the retrieve memory cell command, then step 861 is performed. Otherwise, step 852 is performed.

In step 852, the calculator service processor 112 appends to the History List 910 one or more codes representing the real number stored in the Memory Cell 912. These codes, if sent to the audio unit 220, cause the audio unit 220 to audibly annunciate this real number.

In step 854, the calculator service processor 112 determines whether the current calculation involves a binary operation. The calculator service processor 112 performs step 854 by determining whether the Binary Operator flag 906 is equal to True. If the Binary Operator flag 906 is not equal to true, then the calculator service processor 112 in step 860 sets the Work Area 904 equal to the real number in the Memory Cell 912. Control then returns to flowchart 702 in PIG. 7, as indicated by step 866.

If the calculator service processor 112 in step 854 determines that the Binary Operator flag 906 is equal to true, then step 856 is performed. In step 856, the calculator service processor 112 performs the binary operation indicated by the Operator variable 908 on the real number in the Work Area 904, and the real number in the Memory Cell 912. The calculator service processor 112 stores the result in the Work Area 904. In step 858, the calculator service processor 112 sets the Binary Operator flag 906 equal to False. Control then returns to flowchart 702 in FIG. 7, as indicated by step 866.

If, in step 850, the calculator service processor 112 determined that the translated current entry is not equal to the retrieve memory cell operation, then step 861 is performed. In step 860, the calculator service processor 112 determines whether the translated current entry (as stored in the Input variable 916) is equal to the clear work command.

If the translated current entry is not equal to the clear work command, then control returns to flowchart 702 in FIG. 7, as indicated by step 866. Otherwise, the calculator service processor 112 sets the Work Area 904 to zero, sets the Binary Operator flag 906 to False, sets the Operator variable 908 to the equals command, empties the History List 910, and clears the Number Buffer 918.

In step 864, the calculator service processor 112 provides the ready greeting (as in step 618 in FIG. 6). Control then returns to flowchart 702 in FIG. 7, as indicated by step 866.

Example of the Calculator Service Processor

Operation of the calculator service processor 112 while performing the steps of flowcharts 702 and 802 (in FIGS. 7 and 8) shall now be further described by way of an example. Suppose that the user 114 wishes to perform the following calculation: SQRT(4.3). It is assumed that the user 114 has properly keyed in this calculation using the touch tone keypad of the telephone 104. It is also assumed that the input processor 110 has properly translated the DTMF signals received from the telephone 104 into entries, and has stored these entries in the calculator service processor 112's queue.

In step 706, the calculator service processor 112 retrieves the entry corresponding to the digit 4 from the queue. In step 720, the calculator service processor 112 stores the digit 4 in the Number Buffer 918. Control then returns to step 706 by way of step 722.

In step 706, the calculator service processor 112 retrieves the entry corresponding to the decimal point from the queue. In step 720, the calculator service processor 112 appends the decimal point to the value in the Number Buffer 918, such that the Number Buffer 918 stores "4.". Control then returns to step 706 by way of step 722. In step 706, the calculator service processor 112 retrieves the entry corresponding to the digit 3 from the queue. In step 720, the calculator service processor 112 appends the digit 3 to the value in the Number Buffer 918, such that the Number Buffer 918 stores "4.3". Control then returns to step 706 by way of step 722.

In step 706, the calculator service processor 112 retrieves the entry corresponding to the SQRT command from the queue. In step 728, the calculator service processor 112 determines that a number has been started (since the Number Buffer 918 is not cleared). In step 730, the calculator service processor 112 sets the Input variable 916 equal to the real number in the Number Buffer 918 (i.e., the real number 4.3). In step 732, the calculator service processor 112 sets the New Number flag 914 to True. Control then flows to step 804 in flowchart 802.

In step 804, the calculator service processor 112 determines that the New Number flag 914 is equal to True. Thus, step 806 is performed. In step 806, the calculator service processor 112 stores one or more codes in the History List 910 representing the real number 4.3 that is stored in the Input variable 916. In step 808, the calculator service processor 112 determines that the Binary Operator flag 906 is False. Thus, step 814 is performed. In step 814, the calculator service processor 112 stores the real number from the Input variable 916 in the Work Area 904, and sets the New Number flag 914 to False. Control then flows to step 738 in Flowchart 702.

In step 738, the calculator service processor 112 sets the Input variable 916 equal to the SQRT command. Control then flows to step 804 in flowchart 802.

In step 804, the calculator service processor 112 determines that the New Number flag 914 is equal to False. Thus, step 816 is performed. In step 816, the calculator service processor 112 determines that the Binary Operator flag 906 is equal to False, and thus step 820 is performed. In step 820, the calculator service processor 112 determines that the Input variable 916 does not store a binary operator. Thus, step 828 is performed. In step 828, the calculator service processor 112 determines that the Input variable 916 stores a unary operator. Thus, step 830 is performed.

In step 830, the calculator service processor 112 determines that an error does not exist, and thus performs step 834. In step 834, the calculator service processor 112 applies the unary operator SQRT against the real value 4.3 in the Work Area 904, and stores the result in the Work Area 904. In step 836, the calculator service processor 112 stores one or more codes in the History List 910 representing the unary operator SQRT stored in the Input variable 916. Control then returns to step 706 in flowchart 702.

In step 706, suppose that the calculator service processor 112 retrieves an entry that translates to the equals with confirmation command (suppose that the user 114 keyed in this command so as to confirm the calculation and to receive the calculation results). Thus, in step 728 the calculator service processor 112 determines that the New Number flag 914 is False. Thus, step 738 is performed. In step 738, the calculator service processor 112 stores the equals with confirmation command in the Input variable 916. Control then flows to step 804 in flowchart 802.

In step 804, the calculator service processor 112 determines that the New Number flag 914 is equal to False. Thus, step 816 is performed. In step 816, the calculator service processor 112 determines that the Binary Operator flag 906 is equal to False, and thus step 820 is performed. In step 820, the calculator service processor 112 determines that the Input variable 916 does not store a binary operator. Thus, step 828 is performed. In step 828, the calculator service processor 112 determines that the Input variable 916 does not store a unary operator. Thus, step 838 is performed. In step 838, the calculator service processor 112 determines that the Input variable 916 does not store the equals command. Thus, step 842 is performed. In step 842, the calculator service processor 112 determines that the Input variable 916 stores the equals with confirmation command. Thus, step 844 is performed.

In step 844, the calculator service processor 112 transfers the contents of the History List 910 to the audio unit 220. The audio unit 220, upon receipt of the codes in the History List 910, is caused to audibly annunciate the following (or something similar to the following): "Four Point Three Square Root." Also in step 844, the calculator service processor 112 sends one or more codes to the audio unit 220 representing the word "equals." The audio unit 220, upon receipt of these codes, is caused to audibly annunciate the word "equals." In step 840, the calculator service processor 112 sends one or more codes to the audio unit 220 representing the real number stored in the Work Area 904. The audio unit 220, upon receipt of these codes, is caused to audibly annunciate the following: "Two Point Zero Seven Four." Thus, by operation of steps 844 and 840, the calculator service processor 112 has caused the audio unit 220 to completely annotate the current calculation and its result to the user 114 over the telephone link 116.

Various embodiments will support various precisions of decimal places. One embodiment may allow the user to set the desired precision of decimal places, for example, by an entry in Table 1 of <key to press >, D3, D4, "set precision" such that the number which follows the sequence is the number of decimal points of precision.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In an environment having a service processor unit, a telephone network, and a telephone, wherein a link can be established between the telephone and the service processor unit via the telephone network, the service processor unit having an input processor and a plurality of service processors each providing a service and each associated with a different telephone number, a method of the service processor unit for receiving data and commands from the telephone, comprising the steps of:

(1) establishing a link between the telephone and the service provider unit;

(2) identifying a telephone number dialed;

(3) identifying a service processor associated with said telephone number dialed;

(4) receiving a signal at the input processor from the telephone, via the telephone network, wherein said received signal is generated in response to a single depression of a key on the telephone;

(5) identifying a symbol associated with said received signal;

(6) determining a duration of said received signal;

(7) storing said symbol and duration at said input processor;

(8) transferring said stored symbol and duration to said identified service processor; and (9) assigning a meaning to said received signal as a function of said symbol, said duration, and said identified service processor, said meaning being from a set having any meanings of interest to a user of said identified service processor.

2. The method of claim 1, wherein said received signal is a dual tone multiple frequency (DTMF) signal.

3. The method of claim 1, wherein step (2) comprises the step of:

referring to a frequency of said received signal to identify said symbol associated with said received signal.

4. The method of claim 1, wherein step (9) further comprises:

(a) retrieving from a translation table, unique to said identified service processor, a row having a symbol and duration matching that of said signal; and (b) translating said signal to an interpreted message stored in said retrieved row.

5. The method of claim 4, wherein said translation table is configurable.

6. The method of claim 5, wherein said interpreted message stored in said row can be modified to change said meaning that is assigned in step (9).

7. In an environment having a service processor unit, a telephone network, and a telephone, wherein a link can be established between the telephone and the service processor unit via the telephone network, the service processor unit having an input processor and a plurality of service processors each providing a service and each associated with a different telephone number, a system for receiving data and commands from the telephone, comprising:

means for establishing a link between the telephone and the service provider unit;

means for identifying a telephone number dialed;

means for identifying a service processor associated with said telephone number dialed;

means for receiving a signal at the input processor from the telephone, via the telephone network, wherein said received signal is generated in response to a single depression of a key on the telephone;

means for identifying a symbol associated with said received signal;

means for determining a duration of said received signal;

means for storing said symbol and duration at said input processor;

means for transferring said stored symbol and duration to said identified service processor; and means for assigning a meaning to said received signal as a function of said symbol, said duration, and said identified service processor, said meaning being from a set having any meanings of interest to a user of said identified service processor.

8. The system of claim 7, wherein said received signal is a dual tone multiple frequency (DTMF) signal.

9. The system of claim 7, wherein said means for identifying a telephone number dialed uses a frequency of said received signal to identify said symbol associated with said received signal.

10. The method of claim 7, wherein said means for assigning a meaning to said received signal comprises:

means for retrieving from a translation table, unique to said identified service processor, a row having a symbol and duration matching that of said signal; and means for translating said signal to an interpreted message stored in said retrieved row.

11. The system of claim 7, wherein said translation table is configurable.

12. The system of claim 7, wherein said interpreted message stored in said row can be modified to change said meaning that is assigned.

13. A service processor unit for receiving data and commands from a telephone, said service processor unit comprising:

an input processor;

a plurality of service processors, wherein each of said plurality of service processors is associated with a different telephone number, wherein said input processor includes:

means for identifying a telephone number dialed;

means for identifying which of said plurality of service processors is associated with said telephone number dialed;

means for receiving a signal from the telephone, via a telephone network, wherein said received signal is generated in response to a depression of a key on the telephone;

means for identifying a symbol associated with said received signal;

means for determining a duration of said received signal;

means for storing said symbol and duration; and means for transferring said stored symbol and duration to said identified service processor; and wherein each of said plurality of service processors includes a means for assigning a meaning to said received signal as a function of said symbol and said duration, said meaning being from a service processor specific set.

* * * * *